Oct. 24, 1950  V. M. SCHUSTER  2,527,156

AUTOMATIC BRAKE ADJUSTER

Filed Jan. 28, 1947

Inventor

VERNON M. SCHUSTER,

By McMorrow, Berman & Davidson

Attorneys

Patented Oct. 24, 1950

2,527,156

UNITED STATES PATENT OFFICE 2,527,156

AUTOMATIC BRAKE ADJUSTER

Vernon M. Schuster, Alexandria, Minn.

Application January 28, 1947, Serial No. 724,867

2 Claims. (Cl. 188—79.5)

1

My invention relates to brakes, and more particularly to automobile brake adjusters.

The object of my invention is to provide an automobile brake adjuster adapted to adjust the brakes of an automobile automatically for any wear of the brake lining or the like and to eliminate the expensive manual adjustments by mechanics caused by wearing of the brake parts.

Another object of my invention is to provide an automatic brake adjuster consisting of a minimum of parts, of which only a few move at all and then only a fraction of an inch; thereby assuring a long life to the adjuster and eliminating replacements of worn parts.

Other objects of my invention may appear in the following specification describing my invention with reference to the accompanying drawings illustrating a preferred embodiment of my invention.

It is, however, to be understood that my invention is not to be limited or restricted to the exact construction and combination of parts described in the specification and shown in the drawings, but that such changes and modifications can be made which fall within the scope of the claims appended hereto.

Figure 1:
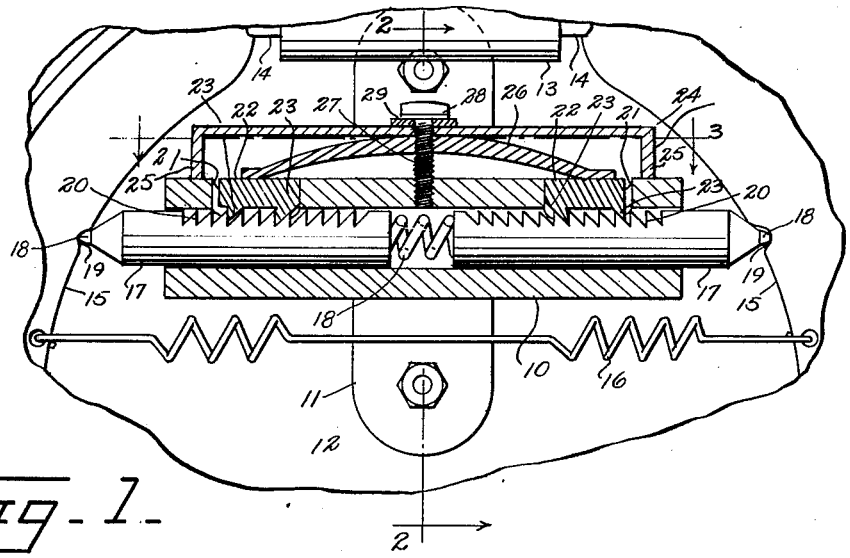
Figure 1 is a fragmentary plan view of an automobile brake equipped with the automatic brake adjuster according to my invention.
Figure 2:
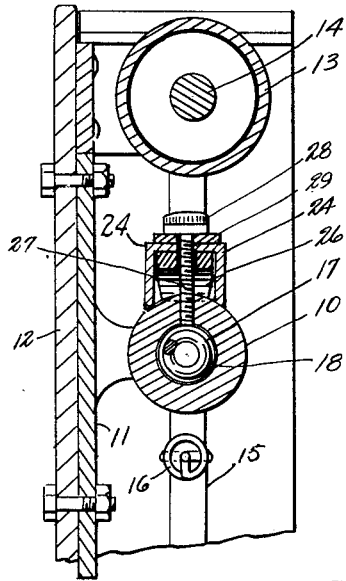
Figure 2 is a sectional view taken on line 2—2 in Figure 1.
Figure 3:
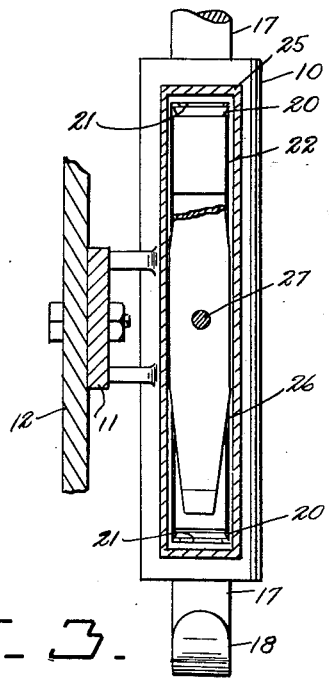
Figure 3 is a sectional view taken on line 3—3 in Figure 1.

Referring now in detail to the drawings, the automatic brake adjuster according to my invention has a hollow cylindrical body 10, resting on a base 11, to which it is fastened in any conventional manner, and which in turn is secured to the bottom 12 of a brake band plate.

This brake drum is of conventional construction and contains a hydraulic wheel cylinder 13, to the piston rods 14 whereof the brake shoes 15 are pivotally secured in the conventional manner. A retractor spring 16 extends between and is secured to the brake shoes 15 to return them into inoperative position when the brake pressure in the cylinder 13 is released.

In the hollow cylindrical body 10, two substantially round adjusting bars 17 are slidably arranged, and between them a helical spring 18 is located urging the adjusting bars 17 outwardly in relation to the cylindrical body 10.

The outer end 18 of each adjusting bar 17 is flattened and adapted to engage a notch 19 provided in the inner circumference of each brake shoe 15.

The upper portion of each adjusting bar 17 is provided with a set of ratchet teeth 20 which are arranged so that the vertical stop surface of each ratchet tooth faces inwardly; i. e., toward the center of the cylindrical body 10.

At a distance from each end of the cylindrical body 10, a rectangular opening 21 is provided in the upper portion of said body 10 uncovering some of the ratchet teeth 20 in the adjusting bar 17.

In each opening 21 in the body 10 a lock key or ratchet dog 22 is arranged which is somewhat shorter than the corresponding opening 21 and provided on its inner surface with two ratchet teeth 23 arranged so that they engage teeth 20 on the adjustment bars 17 one at a time.

A rectangular cover 24 has a downwardly extending circumferential flange 25 fitting onto the top portion of the body 10. A curved leaf or blade spring 26 is arranged under the top of the cover 24 so that the ends of said spring 26 engage the lock keys or ratchet dogs 22 and urge them into engagement with the ratchet teeth 20 on the adjustment bars 17.

A screw 27 extends through the top of the cover 24 and the blade spring 26 and engages the body 10 threadedly to secure the cover 24 and the spring 26 in position. This screw has preferably a knurled head 28, and a washer 29 is located under this head.

When the brakes are applied and the brake shoes 15 move outwardly to engage the brake drum, the helical spring 18 urges the top adjustment bars 17 outwardly so that they remain in engagement with the notches 19 in the brake shoes 15. This movement of the adjustment bars 17 is imparted also to the lock keys or ratchet dogs 22 so that they move outwardly until they contact the outer edges of the rectangular openings 21 in the body. If the outward movement of the brake shoes should continue, the helical spring 18 forces the adjusting bars 17 to slide under the lock keys or ratchet dogs 22. When the brakes are released, the retractor spring 16 withdraws the brake shoes 15 away from the brake drum and thereby forces the adjusting bars 17 inwardly of the body 10, but only to positions in which the ends of lock keys or ratchet dogs 22, 22 abut the inner ends of the openings 21, 21. The ratchet dogs thereby limit the inward movement of the adjusting bars 17 and of the brake shoes 15 to amounts equal to the differences in length between the ratchet dogs 22, 22 and the openings 21.

As the brake lining wears down, the helical spring 18 pushes the adjusting bars 17 further out of the body so that the brake adjustment is made automatically for the life of the brake lining.

Turning the screw 27 in one direction acts to flatten the bowed leaf spring 26 and thereby increase the tension thereof upon the ratchet dogs 22, 22, whereby wear in the ratchet teeth of the dogs and of the bars 17, 17 is compensated for, and lost motion in the operation of the ratchet bars 17, 17 and ratchet dogs 22, 22 is eliminated, whereby more accurate and reliable operation of the device under service conditions is assured. Adjusting the screw 27 in the opposite direction relaxes the spring 26 from an overly compressed condition and permits procuring normal operative engagement of the ratchet dogs 22 with the adjusting bars 17.

Having described my invention, I claim as new and desire to secure by Letters Patent:

1. An automatic brake adjuster comprising a tubular body, a pair of opposed ratchet bars arranged to slide endwise in said body, expanding spring means between and urging said ratchet bars outwardly of the opposite ends of said body, said body being formed on its sidewall with longitudinal openings exposing intermediate portions of said ratchet bars, ratchet dogs positioned in said openings and confined therein for radial movement relative to said body and for longitudinal movement relative to said body, said openings being slightly longer than said ratchet dogs whereby limited movement of said ratchet dogs along said body is provided for, and spring means yieldably urging said ratchet dogs radially inwardly into engagement with said ratchet bars, said spring means comprising a longitudinally arranged leaf spring having its opposite ends engaged with said ratchet dogs, said leaf spring being bowed away from the side of said body, and means mounting said leaf spring on said body comprising adjusting means for flattening said leaf spring in a manner to increase the tension of said leaf spring to increase the force of engagement of said ratchet dogs with the ratchet bars.

2. In an automatic adjuster for a brake involving a pair of opposed shoes mounted for movement away from each other on a brake drum shield for applying the brake, a tubular body mounted on said brake drum shield between said shoes, ratchet bars slidable confined in opposite ends of said body and projecting therefrom into engagement with related shoes, expanding spring means urging said ratchet bars outwardly away from each other, ratchet dogs, means on said body mounting said dogs for limited longitudinal and radial movements relative to said body, positioning spring means on said body engaging both of said ratchet dogs and yieldably urging said ratchet dogs in a radially inward direction into engagement with said ratchet bars, means confining said positioning spring means in place on said body, and adjusting means on the last mentioned means for adjusting the tension of said positioning spring means.

VERNON M. SCHUSTER.

REFERENCES CITED

The following references are of record in the file of this patent:

UNITED STATES PATENTS

| Number | Name | Date |
|---|---|---|
| 1,644,378 | Hirschler | Oct. 4, 1927 |
| 2,002,139 | Des Rosiers | May 21, 1935 |
| 2,057,749 | Tatter | Oct. 20, 1936 |
| 2,154,082 | Baker | Apr. 11, 1939 |
| 2,175,446 | Rasmussen et al. | Oct. 10, 1939 |
| 2,229,919 | Dimont | Jan. 28, 1941 |
| 2,345,062 | Nachtwey | Mar. 28, 1944 |